United States Patent
Sheaffer et al.

[11] Patent Number: 6,084,205
[45] Date of Patent: Jul. 4, 2000

[54] METHOD FOR ENHANCED CONTROL OF WELDING PROCESSES

[75] Inventors: Donald A. Sheaffer, Livermore; Ronald F. Renzi, Tracy; David M. Tung, Livermore; Kevin Schroder, Pleasanton, all of Calif.

[73] Assignee: Sandia Corporation, Livermore, Calif.

[21] Appl. No.: 08/818,091

[22] Filed: Mar. 14, 1997

[51] Int. Cl.⁷ .................................................. B23K 9/095
[52] U.S. Cl. ...................................................... 219/130.21
[58] Field of Search ........................ 219/130.01, 130.21, 219/124.34, 137.71

[56] References Cited

U.S. PATENT DOCUMENTS

| | | | |
|---|---|---|---|
| 3,299,250 | 1/1967 | Vilkas et al. | 219/130.21 |
| 3,335,254 | 8/1967 | Vilkas et al. | 219/130.21 |
| 3,370,151 | 2/1968 | Normando | 219/130.21 |
| 3,627,972 | 12/1971 | Iceland | 219/124 |
| 4,477,712 | 10/1984 | Lillquist | 219/124.34 |
| 4,484,059 | 11/1984 | Lillquist | 219/130.01 |
| 4,594,497 | 6/1986 | Takahashi et al. | 219/124.34 |
| 4,611,111 | 9/1986 | Baheti | 219/124.34 |
| 4,737,614 | 4/1988 | Richardson | 219/130.1 |
| 4,767,911 | 8/1988 | Maram | 219/130.01 |
| 4,831,233 | 5/1989 | Gordon | 219/124.34 |
| 4,975,558 | 12/1990 | Lukens et al. | 219/124.34 |
| 5,275,327 | 1/1994 | Watkins et al. | 228/219 |
| 5,435,478 | 7/1995 | Wood et al. | 219/130.01 |
| 5,475,198 | 12/1995 | Burke et al. | 219/124.34 |
| 5,481,085 | 1/1996 | Kovacevic et al. | 219/130.01 |

*Primary Examiner*—Clifford C. Shaw
*Attorney, Agent, or Firm*—Timothy Evans; Kurt Olsen

[57] ABSTRACT

Method and system for producing high quality welds in welding processes, in general, and gas tungsten arc (GTA) welding, in particular by controlling weld penetration. Light emitted from a weld pool is collected from the backside of a workpiece by optical means during welding and transmitted to a digital video camera for further processing, after the emitted light is first passed through a short wavelength pass filter to remove infrared radiation. By filtering out the infrared component of the light emitted from the backside weld pool image, the present invention provides for the accurate determination of the weld pool boundary. Data from the digital camera is fed to an imaging board which focuses on a 100×100 pixel portion of the image. The board performs a thresholding operation and provides this information to a digital signal processor to compute the backside weld pool dimensions and area. This information is used by a control system, in a dynamic feedback mode, to automatically adjust appropriate parameters of a welding system, such as the welding current, to control weld penetration and thus, create a uniform weld bead and high quality weld.

13 Claims, 5 Drawing Sheets

METHOD FOR ENHANCED CONTROL OF WELDING PROCESSES

STATEMENT OF GOVERNMENT INTEREST

This invention was made with Government support under contract no. DE-AC04-94AL85000 awarded by the U. S. Department of Energy to Sandia Corporation. The Government has certain rights in the invention.

CROSS-REFERENCE TO RELATED APPLICATIONS

Not Applicable.

BACKGROUND OF THE INVENTION

This invention pertains generally to the control of welding processes and particularly to a method for controlling gas tungsten arc welding by measuring and controlling weld penetration.

Arc welding, and particularly gas tungsten arc (GTA) welding, is perhaps one of the most widely used manufacturing processes in the world. As a consequence, great efforts have been made to automate the process and, in particular, to use robotic welders in order to increase productivity and to improve the uniformity and quality of these welds. However, continued development of automated welding processes, particularly those carried out by general purpose manufacturing robots, require continuous information relevant to the quality of the weld being made. This information must, of necessity, be furnished on a real time basis, as the weld is being made, in order to be used as part of a feed-back mechanism to control critical parameters of the welding process.

A significant variable that is extremely useful in determining the quality of a welded joint is the penetration depth of the weld. As is known in the art, there is a relationship between the characteristics of the molten weld pool and the penetration achieved by the welding process. Therefore, in order to produce uniform, high quality welds, generally, and GTA welds, in particular, it is desirable to be able to directly measure and control the size of the weld pool. Because precise control of the weld pool size produces a correspondingly precise control of weld penetration and thus, the quality of the weld significant effort has been expended to measure directly the weld pool characteristics. However, weld pool characteristics are determined by a wide variety of parameters such as: size, thickness, shape and metallurgical characteristics of the workpiece; the amount of heat applied to the workpiece by the welding torch or arc; the impurities in the workpiece, the weld rod and gas cover; the rate of movement of the welding apparatus and/or workpiece; etc. In the past, a skilled welder watched the weld pool and made appropriate adjustments based on experience. However, with the advent of automatic welders and more exacting welding tolerances it has become necessary to instrument what once was done visually.

It will be appreciated by those skilled in the art that one way to produce high quality welds is to monitor the characteristics of the weld pool. If the weld pool exceeds certain predetermined characteristics this deviation can be sensed by appropriate instruments that can feed the information back to automatic equipment to apply compensating adjustments in the welding parameters to maintain weld quality.

A major difficulty encountered in viewing weld pools arises from the severe gradients of light intensity that are developed in the presence of the welding arc. The brightness of the arc generally either overpowers the average brightness of the weld pool or overloads the sensing device. Various sensing devices coupled with wide range of geometries and positioning of the sensing devices have been described to suppress entry of the entire arc light into the sensing device and to extract information about weld pool characteristics. These include the use of various optical elements such as neutral density filters, viewing the weld pool at an oblique angle relative to the welding torch or through the torch, viewing the weld pool with infrared sensors or at selected infrared wavelengths, using spot thermal sensors, and various combinations and permutations thereof as set forth in U.S. Pat. Nos. 5,275,327, 3,627,972, 4,477,712, 5,475,198, 4,975,558, 4,831,233, 5,481,085, 4,737,614, 4,484,059, 4,611,111, 4,767,911, by way of example. In practice the geometry of the surface of the molten weld pool is constantly changing and moreover, the weld pool itself has a specular surface which makes reliable extraction of the weld pool boundary from reflection measurements difficult.

One of the more successful approaches to measuring weld penetration has been to place an infrared sensor at the backside of the workpiece, i.e., on the opposite side of the workpiece from the torch. In this way problems associated with entry of the entire arc light into the sensing device are avoided. As the weld pool penetrates the thickness of the workpiece, its presence can be sensed by radiation detectors such as infrared sensors and appropriate adjustments in welding parameters can be made. However, this approach requires accessibility to the backside of the joint and adequate accessibility is not always available on the hardware to be welded, for example, where two halves of a hemisphere must be welded together. The use of infrared sensors to detect penetration of the weld pool presents additional problems.

As the weld pool begins to penetrate the workpiece the temperature at the backside of the joint increases and infrared radiation begins to be emitted from the backside of the workpiece. The amount of infrared radiation as well as the area radiating increases as the weld pool approaches the backside. The problem now arises of differentiating the weld pool boundary from the general background of infrared radiation being emitted in order to determine the extent of penetration of the weld pool.

What is needed is a method for quantitatively measuring the size of the weld pool at the backside of a workpiece being welded in order to control weld penetration and thus, the quality of the weld. The method should further provide for easy access to the backside of a workpiece even for a workpiece having a complex geometry, such as two halves of a hemisphere.

SUMMARY OF THE INVENTION

To overcome the aforementioned problems associated with determining the quality of a weld and, in particular, a GTA weld, the present invention uniquely combines both a means for observing the backside of a workpiece having a complex geometry and a means for accurately determining the boundary of the weld pool to provide both method and system for measuring and controlling weld penetration.

The present invention is directed to a method for controlling weld penetration by collecting, by optical means and preferably by a borescope, light emitted during welding from the weld pool formed at the backside of a workpiece and transmitting the emitted light to a digital video camera for further processing, after first passing the emitted light through a filter to remove the infrared component of the emitted light. Filtering out all the infrared component of the light emitted from the back side weld pool permits accurate determination of the weld pool boundary. Data from the digital camera is fed to an imaging board which focuses on a 100×100 pixel portion of the digital camera image. The board performs a thresholding operation to separate dark and light pixels, thereby allowing a digital signal processor to compute the backside weld pool dimensions and area. This information is used by a control system, in a dynamic feedback mode, to automatically adjust appropriate parameters of a welding system, such as the welding current, to create the desired weld bead size.

DETAILED DESCRIPTION OF THE INVENTION

The present invention provides a method and apparatus for controlling welding processes, in general, and for GTA welding, in particular, by measuring weld penetration and using the data derived therefrom, coupled with the use of dynamic feedback, to control welding process parameters. As will become evident to those skilled in the art from the following detailed description, the present invention is useful in many welding applications, such as e-beam welding and seam tracking, laser welding and seam tracking, and precision gas welding. However, for the purposes of illustration and convenience in introducing the present invention, application to GTA welding will be used as an example.

Figure 1:
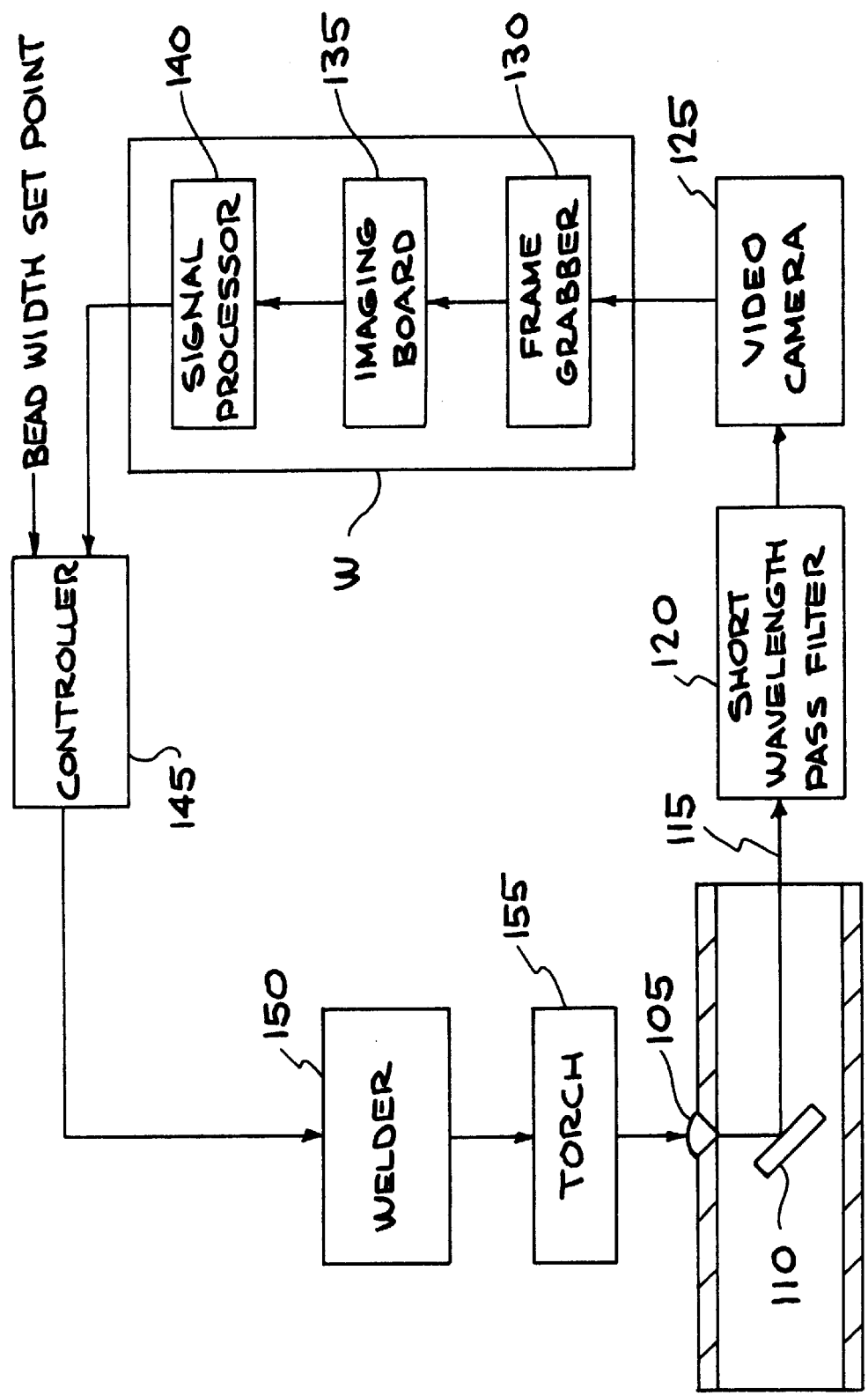
FIG. 1 is a flow diagram of the optical path and elements comprising the welding control system.

As shown in FIG. 1 the welding controller of the present invention 10 includes an optical filter 120 that receives light beam 115 emitted from the backside of weld pool 105 and collected by optical element 110, preferably a borescope, however, other optical elements known to those skilled in the art such as mirrors and prisms are useful.

Figure 2:
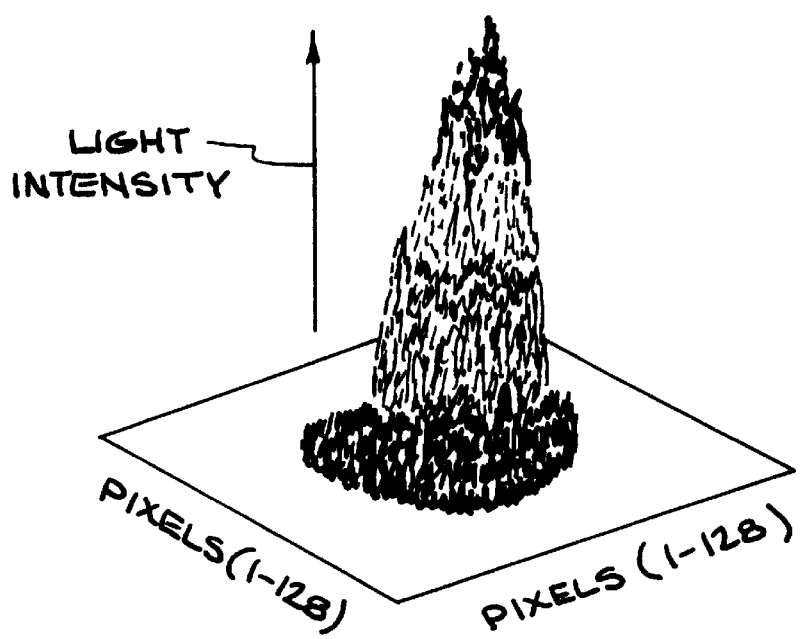
FIG. 2 shows a 3-D plot of short wavelength light intensity at the weld pool.
Figure 3:
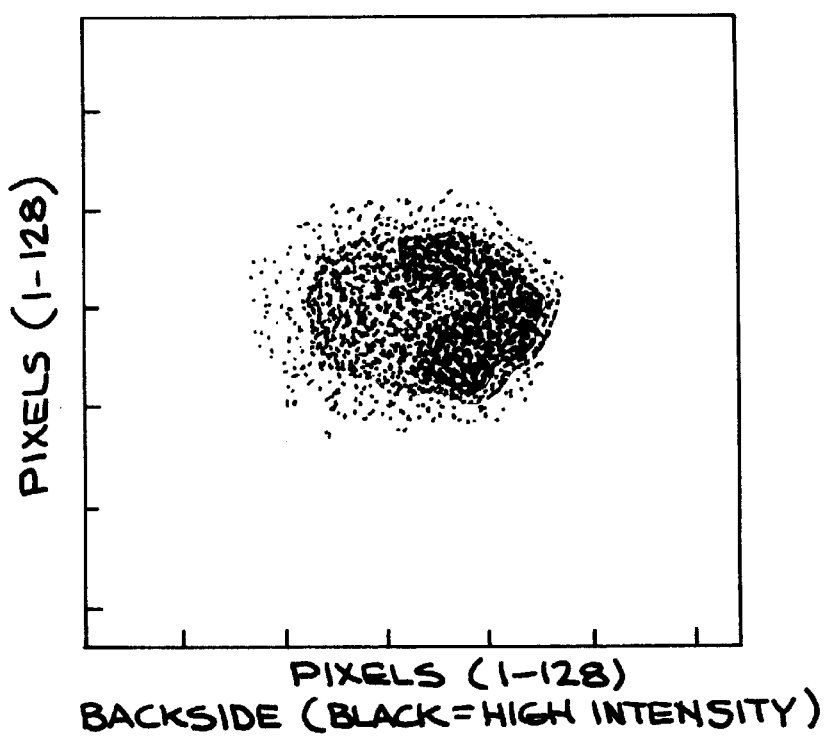
FIG. 3 shows a single frame image of a weld pool.

The present invention distinguishes over prior art methods of controlling weld penetration by allowing only those wavelengths of light beam 115 emitted from backside weld pool 105 between about about 550 nm and 300 nm to pass through to video camera 125. By filtering out the infrared component (i.e., wavelengths longer than 550 nm) of the light emitted from backside weld pool 105 rather than simply attempting to attenuate the infrared light, the inventors have found that the weld pool boundary can be sharply delineated, as shown in FIG. 2. In FIG. 2 the intensity of short wavelength light emitted (i.e., light having a wavelength of between 500 and 300 nm) (ordinate) is shown as a function of position on an image of the backside weld pool (FIG. 3). It can be seen that for a position at the boundary of the backside weld pool the light intensity is very low and as the position is moved toward the center of the backside weld pool, light intensity begins to increase rapidly such that a plot of intensity of short wavelength light emitted as a function of position results in an inverted parabolic surface having very steep sides. An accurate determination of the location of the backside weld pool boundary can now be made by locating the position on the image of the backside weld pool where a sharp gradient in image intensity occurs. By being able to accurately determine the boundary of the backside weld pool it is now possible to accurately determine its extent. Heating of the region adjacent the backside weld pool by thermal conduction from the hot weld pool has no effect on the determination of the backside weld pool boundary because the long wavelength infrared light emitted from this region has been filtered out. Moreover, the steepness of the inverted parabolic surface representing the filtered image allows for image quality and threshold determination to be substantially insensitive to the extremely noisy and volatile environment encountered in GTA welding.

Figure 4A:
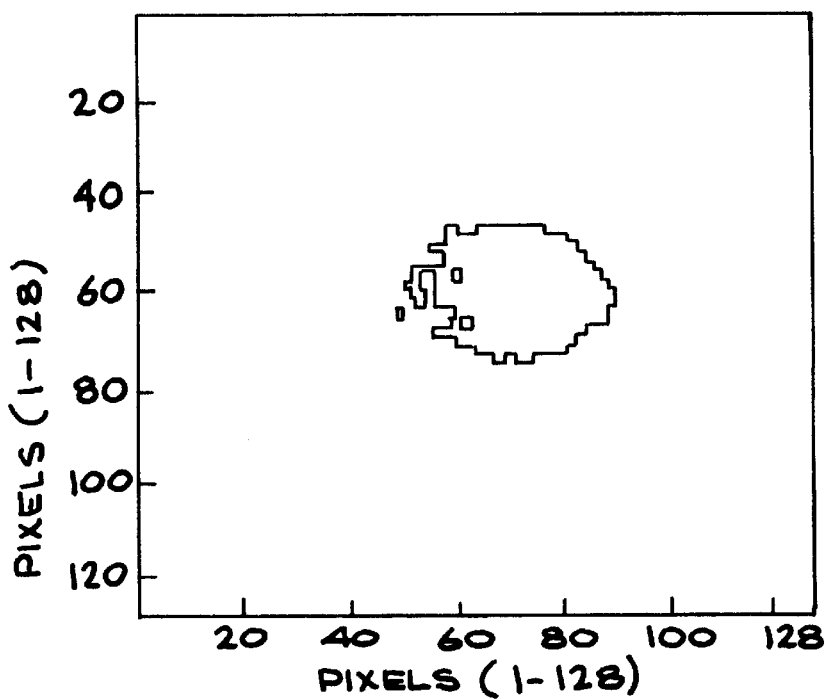
FIG. 4(a) shows the single frame of FIG. 3 after thresholding.
Figure 4B:
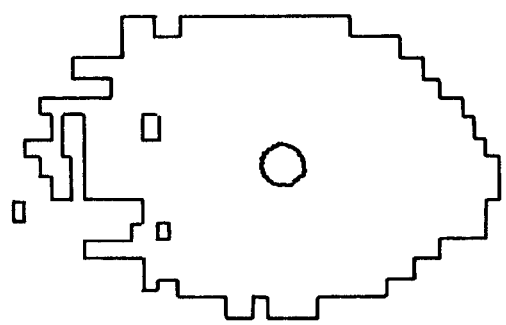
FIG. 4(b) shows the computed center of mass of the thresholded image.
Figure 4C:
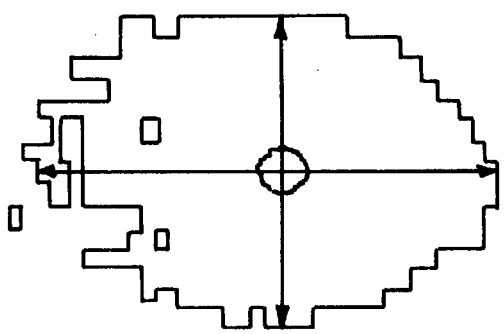
FIG. 4(c) shows the computed width and length of the thresholded image.

After passing through filter 120, light beam 115 enters video camera 125. Data from video camera 125 is fed to weld pool sizer W. Weld pool sizer W includes frame grabber 130 that captures a single video frame of the weld pool, such as that shown in FIG. 3, and uses a high speed analog-to-digital converter to digitize the analog video signal into discrete values representing the strength of the incoming video signal. A frame rate of at least 10 frames a second is required to handle controlling the weld process (control loop bandwidth is about 3 hz). The digitized data from frame grabber 130 is mapped onto a 100×100 pixel array. An imaging board 135, such as available from Spectrum Signal Processing, Burnaby, Quebec, Canada, performs a thresholding operation on the 100×100 pixel array to elevate all pixel intensities above a specific value to the maximum intensity and lowers all intensities below a specific level to the minimum intensity. The intensity level is set by manually adjusting the video camera iris so that the maximum weld pool intensity is approximately 98% of the maximum analog-to-digital scale such that no saturation occurs. The result of the thresholding operation is a two dimensional, black and white representation of the backside weld pool, FIG. 4(a), which is sent to signal processor 140 where the center of mass of the weld pool is calculated, FIG. 4(b). After determining the center of mass, signal processor 140 then determines the width and length of the backside weld pool, FIG. 4(c). It should be noted that the area of the weld pool can also be determined by a simple pixel count. These dimensions of the backside weld pool are then sent to controller 145 along with a desired value of the dimension(s) of the weld pool, the weld pool set point(s). The difference between the dimension(s) determined by signal processor 140 and the weld pool set point(s) is are used by controller 145 to control the welding current supplied by welder 150 to torch 155 by means of a dynamic feedback control algorithm.

In order to better understand and appreciate its nature and scope, the present invention now will be described more fully hereinafter by way of various examples illustrative of the invention. This invention may, however, be embodied in many different forms and should not be construed as limited to the embodiments set forth herein but as defined by the appended claims.

Several different sizes of 304 stainless steel tubing having a wall thickness ranging from 0.065 to 0.080 inches thick were welded using a GTA welder both with and without the welding control method and system described herein. The results of these experiments were compared by measuring the variation in the width of the weld bead produced (deviation about the mean weld bead width). The smaller the deviation in the width of the weld bead the higher the quality of the weld produced

EXAMPLE 1

Figure 5:
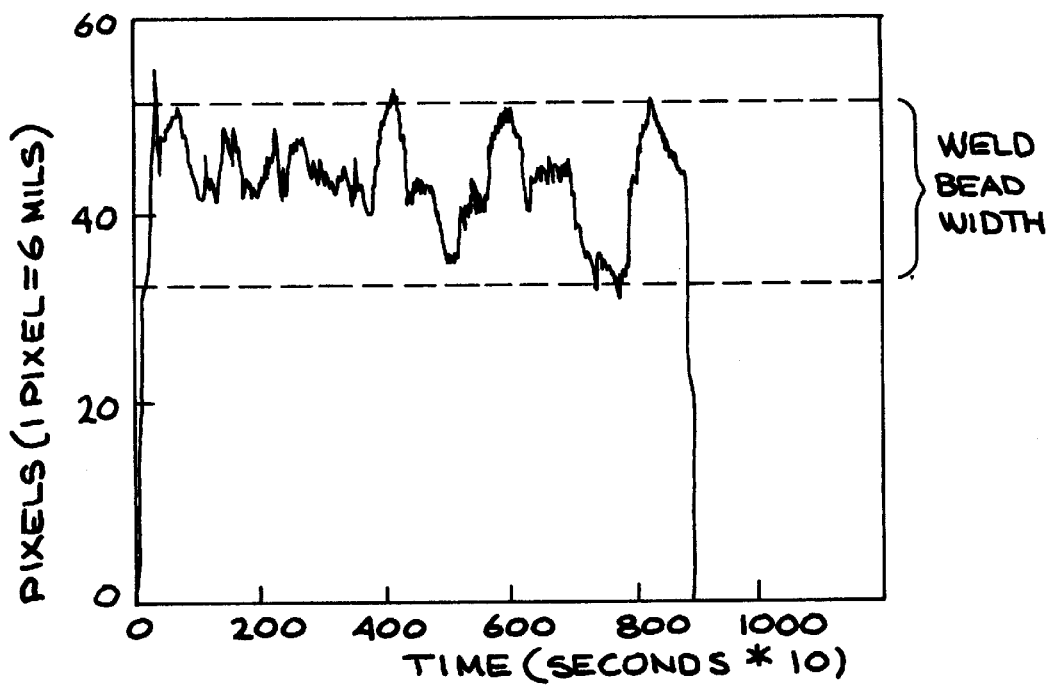
FIG. 5 shows the deviation in back side weld bead width for a GTA weld of a 0.065 inch stainless steel tube without control.

In order to provide a baseline against which to judge the performance of the welding control method and system described herein, a stainless steel tube having a wall thickness of 0.065 inches thick was GTA welded without the benefit of the present invention. Moreover, the stainless steel tube was rotated at rotation speeds that varied from 1–5 inches/min in order to better simulate realistic welding conditions. The results are shown in FIG. 5, wherein the variation in the width of the back side weld bead (in pixel units) is plotted as a function of time. It can be seen that there is a variation in the back side weld bead width of about +/−10 pixel units, corresponding to about +/−0.060 inches.

EXAMPLE 2

Figure 6:
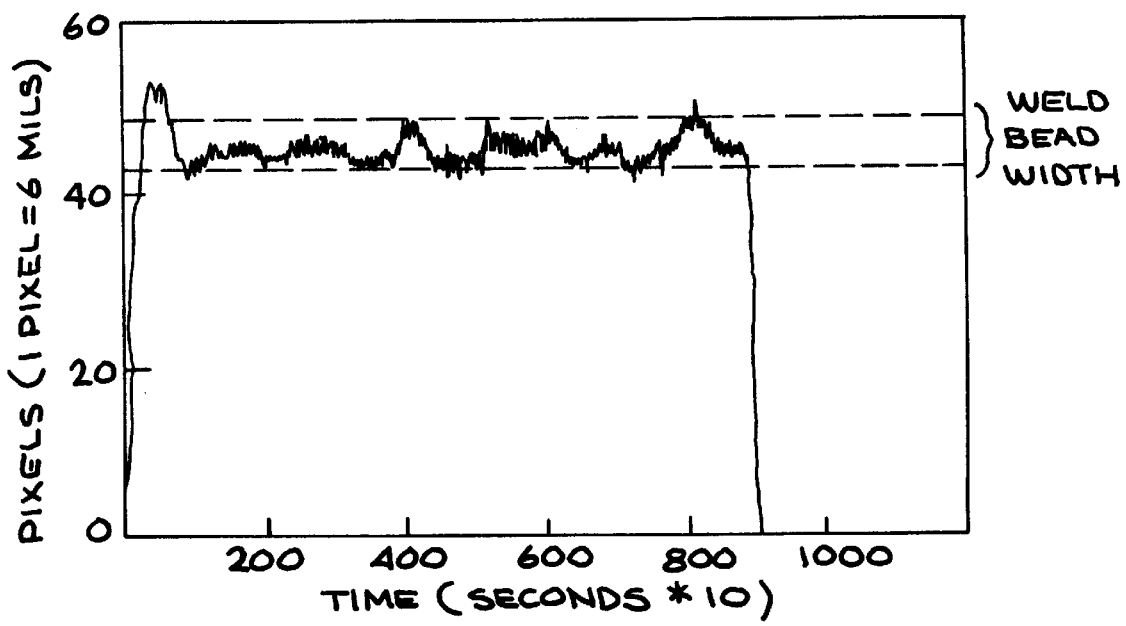
FIG. 6 shows the deviation in back side weld bead width for a GTA weld of a 0.065 inch stainless steel tube with control.

In this example the conditions of Example 1 were repeated except that the GTA welding of a stainless steel tube having a wall thickness of 0.065 inches thick was done with the aid of the weld control method and system set forth herein. As in Example 1 the rotation speed of the tube in the GTA welder was varied by a factor of 5. The results are shown in FIG. 6. It can be seen that the variation in the back side bead width is about +/−3 pixel units, corresponding to about +/−0.018 inches.

EXAMPLE 3

Figure 7:
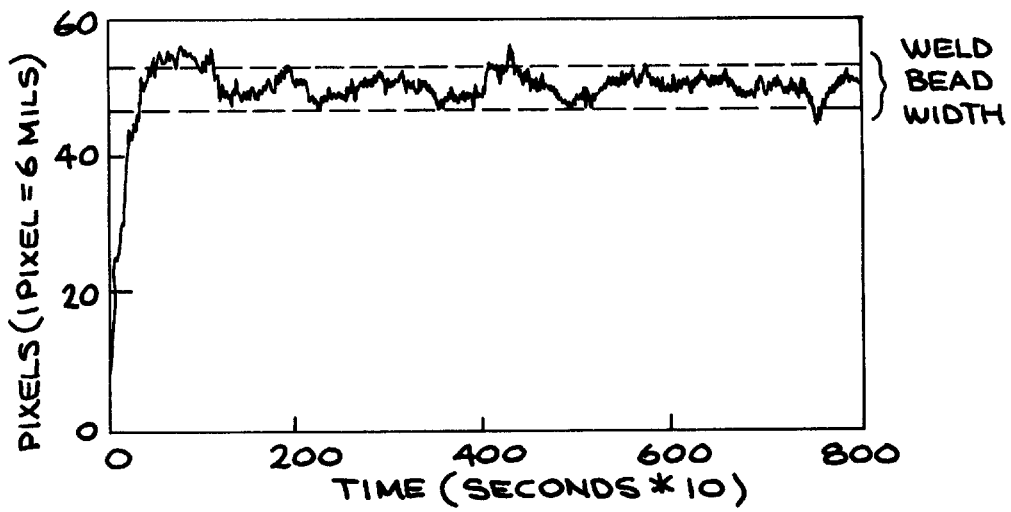
FIG. 7 shows the deviation in back side weld bead width for a 0.080 inch stainless steel tube.

This example repeats Example 2 except that the wall thickness of the stainless steel tube was 0.080 inches thick. The results are shown in FIG. 7. The variation in back side weld bead width amounts to about +/−2 pixel units of about +/−0.012 inches.

EXAMPLE 4

Figure 8:
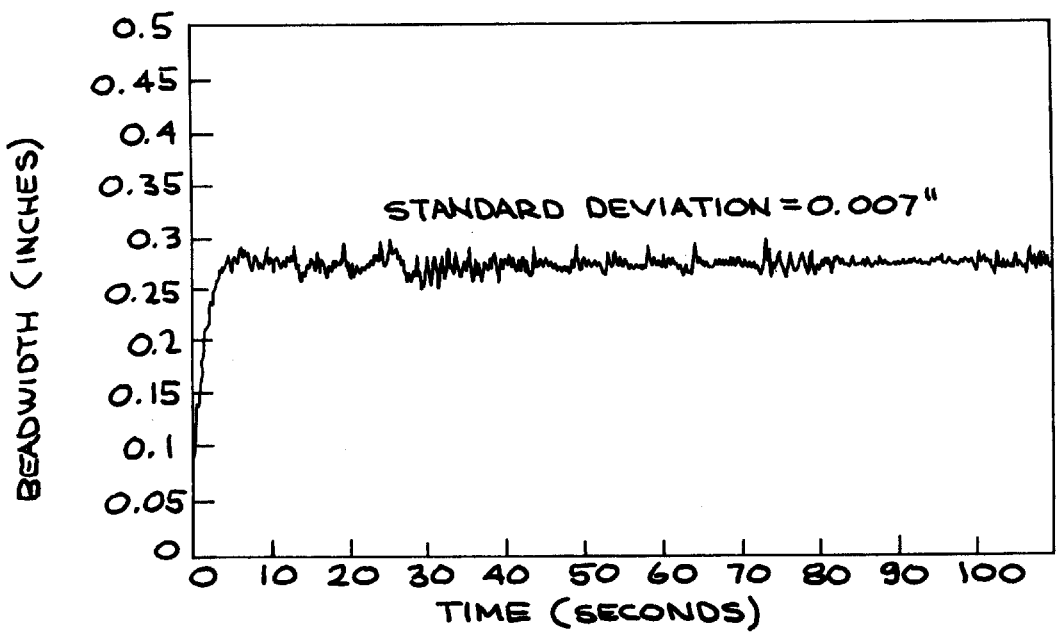
FIG. 8 shows the deviation in back side weld bead width for GTA welding of two hemispheres.

In this example, two hemispherical shells were welded together with a GTA welder using the method and system described herein. A borescope was used to collect light emitted from the backside weld pool. FIG. 8 shows the variation in the backside weld bead width. It can be seen that for a backside weld bead having a nominal width of 0.275 inches the variation in width of the weld bead was about +/−0.007 inches.

In summary, by using an optical element to collect light emitted from the backside of the workpiece and by filtering out the infrared light emitted therefrom, the present invention provides for rapidly and accurately measuring the dimensions of the weld pool at the backside of a workpiece and an economical and responsive means for controlling weld penetration and thus, weld quality.

SEQUENCE LISTING

Not Applicable.

We claim:

1. A method for controlling a welding process, comprising the steps of:

a) applying a source of energy to a workpiece, said source of energy forming a molten weld pool on a front side of said workpiece, said molten weld pool forming a corresponding heated zone on a back side of said workpiece, said heated zone located directly beneath said molten weld pool, said heated zone a source of emitted radiation, said radiation having a continuous plurality of wavelengths from about infrared to about ultraviolet wavelengths;

b) collecting and transmitting at least some of said emitted radiation into an imaging means, said imaging means at least sensitive to visible light having wavelengths between about 650 nm to about 400 nm, said step of collecting further including a collecting means, said collecting means maintained directly facing said heated zone and in coupled alignment with said source of energy;

c) interposing a filter means between said imaging means and said source of said emitted radiation, said filter means for preventing light having wavelengths longer than about 550 nm from passing through said filter;

d) generating an digital image signal within said imaging means using only light passing through said filter means, said imaging means having pixels, said light passing through said filter means representative of an image of said molten weld pool;

e) processing said digital image signal and computing at least one characteristic length dimension of said image therefrom;

f) comparing said computed characteristic length dimension to a pre-established length dimension;

g) applying a dynamic feedback means to said source of energy, wherein said feedback means is based upon minimizing the difference between said computed characteristic length dimension and said pre-established length dimension; and h) moving said source of energy along a predetermined path and controlling said welding process by repeating steps b) through g).

2. The method of claim 1, wherein said step of processing includes determining a boundary of said image of said molten weld pool.

3. The method of claim 2, wherein in said boundary of said image of said molten weld pool is determined by locating those positions wherein a sharp gradient in said digitized image signal occurs.

4. The method of claim 1, further including the step of thresholding, wherein said step of thresholding comprises comparing all said imaging means pixel intensities to an established threshold intensity level and elevating all said pixel intensities to a maximum intensity level and further including reducing all said pixel intensities below said threshold intensity to a minimum intensity level, thereby defining the extent of said molten weld pool.

5. The method of claim 1, wherein said step of generating takes place at a rate of at least 10 frames/sec.

6. A system for controlling a welding process, comprising:

a) a source of energy for melting adjacent and mating parts of a workpiece, said source of energy capable of forming a molten weld pool on a front side of said workpiece, said molten weld pool forming a corresponding heated zone on a back side of said workpiece, said heated zone located directly beneath said molten weld pool, said heated zone a source of emitted radiation, said radiation having a continuous plurality of wavelengths from about infrared to about ultraviolet wavelengths;

b) means for collecting and transmitting at least some of said emitted radiation into an imaging means, said imaging means at least sensitive to visible light having wavelengths between about 650 nm to about 400 nm, said collecting means directly facing said heated zone and maintained in coupled alignment with said source of energy;

c) an optical filter means, said filter interposed between said imaging means and said source of said emitted radiation, said filter means for preventing light having wavelengths longer than about 550 nm from passing through said filter;

d) an image signal generated by said imaging means using only light passing through said filter means, said light passing through said filter means representative of an image of said molten weld pool;

e) image signal processing means for digitizing said image signal;

f) computing means for calculating at least one characteristic length dimension of said image therefrom;

g) means for comparing said calculated characteristic length dimension to a pre-established length dimension;

h) a dynamic feedback means for controlling said source of energy, wherein said feedback means is based upon minimizing the difference between said computed characteristic length dimension and said pre-established length dimension; and i) means for moving said source of energy along a predetermined path while repeating steps b) through h).

7. The system of claim 6, wherein said means for collecting and transmitting comprise a borescope.

8. The system of claim 6, wherein said imaging means is a digital video camera.

9. The system of claim 6, wherein said image signal processing means comprises a digitizing frame grabber and an imaging board.

10. A system for controlling a gas tungsten arc welding process, comprising:

a) a source of energy for melting adjacent and mating parts of a workpiece, said source of energy capable of forming a molten weld pool on a front side of said workpiece, said molten weld pool forming a corresponding heated zone on a back side of said workpiece, said heated zone located directly beneath said molten weld pool, said heated zone a source of emitted radiation, said radiation having a continuous plurality of wavelengths from about infrared to about ultraviolet wavelengths;

b) means for collecting and transmitting at least some of said emitted radiation into an imaging means, said imaging means at least sensitive to visible light having wavelengths between about 650 nm to about 400 nm, said collecting means directly facing said heated zone and maintained in coupled alignment with said source of energy;

c) an optical filter means, said filter interposed between said imaging means and said source of said emitted radiation, said filter means for preventing light having wavelengths longer than about 550 nm from passing through said filter;

d) an image signal generated by said imaging means using only light passing through said filter means, said light passing through said filter means representative of an image of said molten weld pool;

e) image signal processing means for digitizing said image signal;

f) computing means for calculating at least one characteristic length dimension of said image therefrom;

g) means for comparing said calculated characteristic length dimension to a pre-established length dimension;

h) a dynamic feedback means for controlling said source of energy, wherein said feedback means is based upon minimizing the difference between said computed characteristic length dimension and said pre-established length dimension; and i) means for moving said source of energy along a predetermined path while repeating steps b) through h).

11. The system of claim 10, wherein said means for collecting and transmitting comprise a borescope.

12. The system of claim 10, wherein said imaging means is a digital video camera.

13. The system of claim 10, wherein said image signal processing means comprises a digitizing frame grabber and an imaging board.

* * * * *